United States Patent
Agarwal et al.

(10) Patent No.: US 7,028,037 B1
(45) Date of Patent: Apr. 11, 2006

(54) OPERATORS FOR ACCESSING HIERARCHICAL DATA IN A RELATIONAL SYSTEM

(75) Inventors: Nipun Agarwal, Santa Clara, CA (US); Ravi Murthy, Hayward, CA (US); Eric Sedlar, San Francisco, CA (US); Sivasankaran Chandrasekar, Palo Alto, CA (US); Fei Ge, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 421 days.

(21) Appl. No.: 10/260,138

(22) Filed: Sep. 27, 2002

Related U.S. Application Data (60) Provisional application No. 60/326,052, filed on Sep. 28, 2001, provisional application No. 60/678,800, filed on May 7, 2002.

(51) Int. Cl.
*G06F 7/00* (2006.01)
*G06F 17/00* (2006.01)

(52) U.S. Cl. .............. 707/100; 707/1; 707/2; 707/3; 707/4; 707/104.1; 709/201; 709/217; 709/218; 709/229

(58) Field of Classification Search .......... 707/1–4, 707/100–103 R, 104.1, 200; 709/201, 217, 709/218, 226, 229
See application file for complete search history.

(56) References Cited

U.S. PATENT DOCUMENTS

| | | | |
|---|---|---|---|
| 5,295,261 A * | 3/1994 | Simonetti | 707/2 |
| 5,404,513 A | 4/1995 | Powers et al. | |
| 5,467,471 A * | 11/1995 | Bader | 707/1 |
| 5,680,614 A | 10/1997 | Bakuya et al. | |
| 5,724,577 A * | 3/1998 | Exley et al. | 707/100 |
| 5,734,887 A * | 3/1998 | Kingberg et al. | 707/4 |
| 5,974,407 A * | 10/1999 | Sacks | 707/2 |
| 6,003,040 A | 12/1999 | Mital et al. | |
| 6,038,563 A | 3/2000 | Bapat et al. | |
| 6,055,544 A | 4/2000 | DeRose et al. | |
| 6,061,684 A | 5/2000 | Glasser et al. | |
| 6,128,610 A | 10/2000 | Srinivasan et al. | |
| 6,141,655 A | 10/2000 | Johnson et al. | |

(Continued)

FOREIGN PATENT DOCUMENTS

WO    WO 01/59602 A1    8/2001

(Continued)

OTHER PUBLICATIONS

R. Bourret, et al., "A Generic Load/Extract Utility For Data Transfer Between XML Documents and Relational Databases," Proc. Second International Workshop on Advanced Issues of E-Commerce and Web-Based Information Systems, IEEE Computing Society, Jun. 8-9, 2000, pp. 134-143.

(Continued)

*Primary Examiner*—Jeffrey Gaffin
*Assistant Examiner*—Jacques Veillard
(74) *Attorney, Agent, or Firm*—Marcel K. Bingham; Hickman Palermo Truong & Becker LLP (57) ABSTRACT

Techniques and systems are provided for efficiently managing hierarchical relational data stored in object-relational database system by extending the syntax of the database language supported by the database system (e.g. SQL) to incorporate several new "hierarchical" operators. These operators are evaluated based on the hierarchical relationship defined for hierarchical relational data. The operators maybe incorporated in SQL queries along with relational operators.

21 Claims, 4 Drawing Sheets

U.S. PATENT DOCUMENTS

| | | |
|---|---|---|
| 6,154,741 A | 11/2000 | Feldman |
| 6,189,012 B1 | 2/2001 | Mital et al. |
| 6,199,195 B1 | 3/2001 | Goodwin et al. |
| 6,208,993 B1 | 3/2001 | Shadmone |
| 6,236,988 B1 | 5/2001 | Aldred |
| 6,263,332 B1 | 7/2001 | Nasr et al. |
| 6,269,380 B1 | 7/2001 | Terry et al. |
| 6,279,006 B1 | 8/2001 | Shigemi et al. |
| 6,279,007 B1 | 8/2001 | Uppala |
| 6,298,349 B1 | 10/2001 | Toyoshima et al. |
| 6,343,287 B1 | 1/2002 | Kumar et al. |
| 6,356,920 B1 | 3/2002 | Vandersluis |
| 6,366,934 B1 | 4/2002 | Cheng et al. |
| 6,370,537 B1 | 4/2002 | Gilbert et al. |
| 6,470,344 B1 | 10/2002 | Kothuri et al. |
| 6,487,546 B1 | 11/2002 | Witkowski |
| 6,496,842 B1 | 12/2002 | Lyness |
| 6,571,231 B1* | 5/2003 | Sedlar ............................ 707/1 |
| 6,604,100 B1 | 8/2003 | Fernandez et al. |
| 6,636,845 B1 | 10/2003 | Chau et al. |
| 6,704,739 B1 | 3/2004 | Craft et al. |
| 6,704,747 B1 | 3/2004 | Fong |
| 6,718,322 B1* | 4/2004 | Brye ............................ 707/3 |
| 6,725,212 B1 | 4/2004 | Couch et al. |
| 6,754,661 B1* | 6/2004 | Hallin et al. ................ 707/100 |
| 6,772,350 B1 | 8/2004 | Belani et al. |
| 6,785,673 B1 | 8/2004 | Fernandez et al. |
| 2002/0184401 A1 | 12/2002 | Kadel, Jr. et al. |
| 2003/0004937 A1 | 1/2003 | Salmenkaita et al. |
| 2003/0009361 A1 | 1/2003 | Hancock et al. |
| 2003/0065659 A1 | 4/2003 | Agarwal et al. |
| 2003/0093672 A1 | 5/2003 | Cichowlas |
| 2003/0101194 A1 | 5/2003 | Rys et al. |
| 2003/0182624 A1 | 9/2003 | Large |
| 2004/0043758 A1 | 3/2004 | Sorvari et al. |
| 2004/0064466 A1 | 4/2004 | Manikutty et al. |
| 2004/0176958 A1 | 9/2004 | Salmenkaita et al. |
| 2004/0225680 A1 | 11/2004 | Cameron et al. |
| 2005/0050058 A1 | 3/2005 | Jain et al. |
| 2005/0050092 A1 | 3/2005 | Jain et al. |

FOREIGN PATENT DOCUMENTS

| | | |
|---|---|---|
| WO | WO 01/61566 A1 | 8/2001 |

OTHER PUBLICATIONS

S. Vorthmann, et al. "Beyond Schemas, Schema Adjuncts and the Outside World," Markup Languages, Online!, vol. 2, No. 3, Jun. 2000, pp. 1-8.

Mi-Ok Chae, et al., "Design and Implementation of an Object-Oriented Multimedia DBMS Tightly Coupled with Information Retrieval Functions," Proc. 17$^{th}$ IASTED International Conference on Applied Informatics, Feb. 15-18, 1999, abstract.

Hansrudi Noser, et al., "Dynamic 3D Visualization of Database-Defined Tree Structures on the WWW by Using Rewriting Systems," 2000, IEEE, XP-002262516, pp. 247-254.

Sushil Jajodia, et al., "Toward a Multilevel Secure Relational Data Model," ACM, 1991, 8393 SIGMOD Record, Jun. 20, 1991, No. 2, New York, US, XP 000364619, pp. 50-59.

Daniele Braga et al., "A Graphical Environment to Query XML Data with Query," Proceedings of the Fourth International Conference on Web Information Systems Engineering (WISE '03), 2003, IEEE, 10 pages.

Josephine Cheng, et al., "IBM DB2 XML Extender, An end-to-end solution for storing and retreiving XML documents.," IEEE, 2000, ICDE '00 Conference, San Diego, Feb. 2000, 128 pages.

Chen, Ruey-Shun et al., "Developing an XML framework for metadata system", Trinity College Dublin, Proc. of the 1st Inter. Sympo. on Information and Communication, pp. 267-272.

Manolescu, Dragos, Review of "Metadata solutions: using metamodels, repositories, XML, and enterprise portals to generate information on demand by Adrienne Tannenbaum", Mar. 2003, ACM Press, vol. 28, Issue 2, p. 38.

\* cited by examiner

| NODE | NAME | DATA |
|---|---|---|
| 1 | a | D1 |
| 2 | b | D2 |
| 3 | c | D3 |
| 4 | d | D4 |
| 5 | e | D5 |
| 6 | f | D6 |
| 7 | a | D7 |

| PARENT | CHILD |
|---|---|
| <ROOT> | 1 |
| 1 | 2 |
| 1 | 3 |
| 2 | 4 |
| 2 | 5 |
| 3 | 6 |
| 3 | 7 |

FIG. 4

OPERATORS FOR ACCESSING HIERARCHICAL DATA IN A RELATIONAL SYSTEM

RELATED APPLICATIONS

The present application claims priority from the following U.S. Provisional Patent Applications, the entire contents of which are incorporated herein by reference for all purposes:

U.S. Provisional Patent Application No. 60/326,052, filed on Sep. 28, 2001, entitled FILE BASED ACCESS PROVIDED WITH A DATABASE SYSTEM, by ERIC SEDLAR and VISWANATHAN KRISHNAMURTHY;

U.S. Provisional Patent Application No. 60/378,800, filed on May 7, 2002, entitled SQL ACCESS TO DATA THAT PROVIDES A FILE SYSTEM ABSTRACTION, by NIPUN AGARWAL, RAVI MURTHY, ERIC SEDLAR, SIVASANKARAN CHANDRASEKAR, FEI GE, SYAM PANNALA, NEEMA JALALI and MURALIDHAR KRISHNAPRASAD.

The present application is also related to the following U.S. patent applications, the entire contents of which are incorporated herein by reference for all purposes:

U.S. patent application Ser. No. 10/260,384, filed on Sep. 27, 2002, entitled PROVIDING A CONSISTENT HIERARCHICAL ABSTRACTION OF RELATIONAL DATA, by NIPUN AGARWAL, ERIC SEDLAR, RAVI MURTHY and NAMIT JAIN;

U.S. patent application Ser. No. 10/259,278, filed on Sep. 27, 2002, entitled MECHANISM FOR MAPPING XML SCHEMAS TO OBJECT-RELATIONAL DATABASE SYSTEMS, by RAVI MURTHY, MURALIDHAR KRISHNAPRASAD, SIVASANKARAN CHANDRASEKAR, ERIC SEDLAR, VISWANATHAN KRISHNAMURTHY and NIPUN AGARWAL;

U.S. patent application Ser. No. 10/260,161, filed on Sep. 27, 2002, entitled INDEXING TO EFFICIENTLY MANAGE VERSIONED DATA IN A DATABASE SYSTEM, by NIPUN AGARWAL, ERIC SEDLAR and RAVI MURTHY;

U.S. patent application Ser. No. 10/256,524, filed on Sep. 27, 2002, entitled MECHANISMS FOR STORING CONTENT AND PROPERTIES OF HIERARCHICALLY ORGANIZED RESOURCES, by RAVI MURTHY, ERIC SEDLAR, NIPUN AGARWAL, and NEEMA JALALI;

U.S. patent application Ser. No. 10/259,176, filed on Sep. 27, 2002, entitled MECHANISM FOR UNIFORM ACCESS CONTROL IN A DATABASE SYSTEM, by RAVI MURTHY, ERIC SEDLAR, NIPUN AGARWAL, SAM IDICULA and NICK MONTOYA;

U.S. patent application Ser. No. 10/256,777, filed on Sep. 27, 2002, entitled LOADABLE UNITS FOR LAZY MANIFESTATION OF XML DOCUMENTS by SYAM PANNALA, ERIC SEDLAR, BHUSHAN KHALADKAR, RAVI MURTHY, SIVASANKARAN CHANDRASEKAR, and NIPUN AGARWAL;

U.S. patent application Ser. No. 10/260,381, filed on Sep. 27, 2002, entitled MECHANISM TO EFFICIENTLY INDEX STRUCTURED DATA THAT PROVIDES HIERARCHICAL ACCESS IN A RELATIONAL DATABASE SYSTEM, by NEEMA JALALI, ERIC SEDLAR, NIPUN AGARWAL, and RAVI MURTHY;

FIELD OF THE INVENTION

The present invention relates to relational database systems and, more specifically, to techniques for managing hierarchical data within relational database systems.

BACKGROUND OF THE INVENTION

Humans tend to organize information in categories. The categories in which information is organized are themselves typically organized relative to each other in some form of hierarchy. For example, an individual animal belongs to a species, the species belongs to a genus, the genus belongs to a family, the family belongs to an order, and the order belongs to a class.

With the advent of computer systems, techniques for storing electronic information have been developed that largely reflected this human desire for hierarchical organization. Conventional computer file systems, for example, are typically implemented using hierarchy-based organization principles. Specifically, a typical file system has directories arranged in a hierarchy, and documents stored in the directories. Ideally, the hierarchical relationships between the directories reflect some intuitive relationship between the meanings that have been assigned to the directories. Similarly, it is ideal for each document to be stored in a directory based on some intuitive relationship between the contents of the document and the meaning assigned to the directory in which the document is stored.

Figure 1:
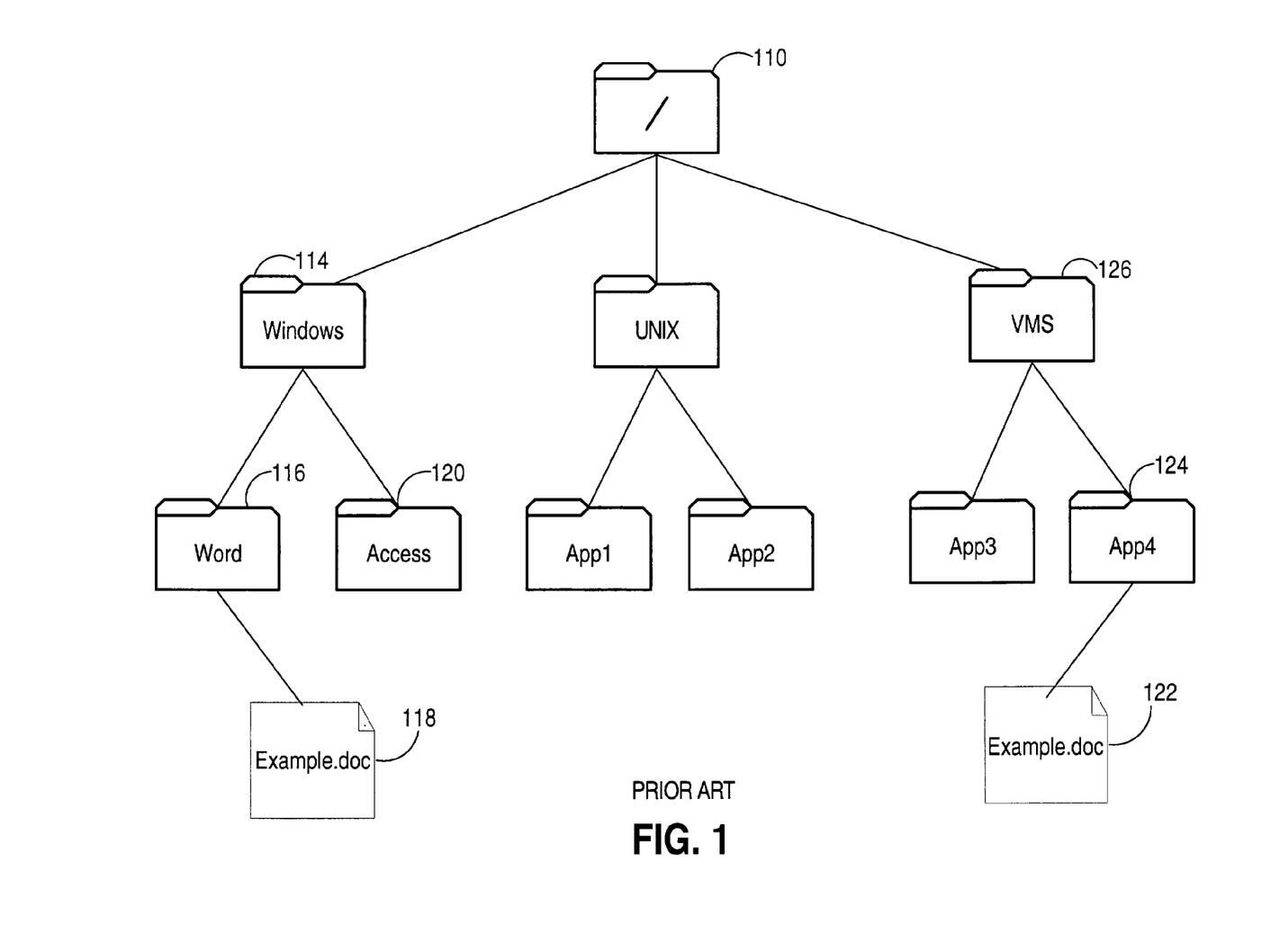
FIG. 1 is a block diagram illustrating a hierarchical file system.

FIG. 1 shows an example of a typical file system. The illustrated file system includes numerous directories arranged in a hierarchy. Two documents 118 and 122 are stored in the directories. Specifically, documents 118 and 122, both of which are entitled "Example.doc", are respectively stored in directories 116 and 124, which are respectively entitled "Word" and "App4".

In the directory hierarchy, directory 116 is a child of directory 114 entitled "Windows", and directory 114 is a child of directory 110. Similarly, directory 124 is a child of directory 126 entitled "VMS", and directory 126 is a child of directory 110. Directory 110 is referred to as the "root" directory because it is the directory from which all other directories descend. In many systems, the symbol "/" is used to refer to the root directory.

When electronic information is organized in a hierarchy, each item of information may be located by following a "path" through the hierarchy to the entity that contains the item. Within a hierarchical file system, the path to an item begins at the root directory and proceeds down the hierarchy of directories to eventually arrive at the directory that contains the item of interest. For example, the path to file 118 consists of directories 110, 114 and 116, in that order.

Hierarchical storage systems often allow different items to have the same name. For example, in the file system shown in FIG. 1, both of the documents 118 and 122 are entitled "Example.doc". Consequently, to unambiguously identify a given document, more than just the name of the document is required.

A convenient way to identify and locate a specific item of information stored in a hierarchical storage system is through the use of a "pathname". A pathname is a concise way of uniquely identifying an item based on the path through the hierarchy to the item. A pathname is composed of a sequence of names. In the context of a file system, each name in the sequence of names is a "filename". The term "filename" refers to both the names of directories and the names of documents, since both directories and documents are considered to be "files".

Within a file system, the sequence of filenames in a given pathname begins with the name of the root directory, includes the names of all directories along the path from the root directory to the item of interest, and terminates in the name of the item of interest. Typically, the list of directories to traverse is concatenated together, with some kind of separator punctuation (e.g., '/', '\', or ';') to make a pathname. Thus, the pathname for document 118 is /Windows/Word/Example.doc, while the pathname for document 122 is /VMS/App4/Example.doc.

The relationship between directories (files) and their contained content varies significantly between different types of hierarchically organized systems. One model, employed by various implementations, such as Windows and DOS file systems, requires each file to have exactly one parent, forming a tree. In a more complicated model, the hierarchy takes the form of a directed graph, where files can have multiple parents, as in the UNIX file system in which hard links are used.

In contrast to hierarchical approaches to organizing electronic information, a relational database stores information in tables comprised of rows and columns. Each row is identified by a unique RowID. Each column represents an attribute of a record, and each row represents a particular record. Data is retrieved from the database by submitting queries to a database management system (DBMS) that manages the database. The queries must conform to the database language supported by the database management system. Structured Query Language (SQL) is an example of a database language supported by many existing database management systems.

Each type of storage system has advantages and limitations. A hierarchically organized storage system is simple, intuitive, and easy to implement, and is a standard model used by most application programs. Unfortunately, the simplicity of the hierarchical organization does not provide the support required for complex data retrieval operations. For example, the contents of every directory may have to be inspected to retrieve all documents created on a particular day that have a particular filename. Since all directories must be searched, the hierarchical organization does nothing to facilitate the retrieval process.

A relational database system is well suited for storing large amounts of information and for accessing data in a very flexible manner. Relative to hierarchically organized systems, data that matches even complex search criteria may be easily and efficiently retrieved from a relational database system. However, the process of formulating and submitting queries to a database server is less intuitive than merely traversing a hierarchy of directories, and is beyond the technical comfort level of many computer users.

In the past, hierarchically organized systems and relationally organized systems have been implemented in different ways that were not compatible. With some additional processing, however, a relationally organized system can emulate a hierarchically organized system. This type of emulation is especially desirable when the storage capability and flexibility of a relational system is needed, but the intuitiveness and ubiquity of the hierarchical system is desired.

When hierarchically organized information is stored in a relational database system, the power of the relational system may be tapped by accessing the information using the access mechanism that is native to the relational database system. Specifically, using the database language supported by the database, complex queries can be formulated to extract the desired information from the database. However, the information that is of interest to a user may hinge on the position of the information within the applicable information hierarchy. Unfortunately, because database languages were designed based on the relational database model, the concept of hierarchical relationships is largely foreign to them. Consequently, it is desirable to provide a mechanism for querying information, stored within a relational database, based on the position of the information within the applicable hierarchy. It is further desirable to provide a mechanism for using queries to easily extract information about the position of information within the applicable information hierarchy.

SUMMARY OF THE INVENTION

Techniques and systems are provided for efficiently managing hierarchical relational data stored in object-relational database system by extending the syntax of the database language supported by the database system (e.g. SQL) to incorporate several new "hierarchical" operators. These operators are evaluated based on the hierarchical relationship defined for hierarchical relational data. The operators may be incorporated in SQL queries along with relational operators.

For example, assume rows of a table represent nodes in an XML tree. Each row is associated with a path for the node that corresponds to the row. An "UNDER_PATH" operator takes an argument that specifies a node in the hierarchy (the "input" node) and returns true for a row if the node associated with the row falls on or below the input node. The operator "PATH" returns the path to the node associated with a row. In one embodiment, if a query evaluates multiple hierarchical operators, such as "UNDER_PATH" and "PATH", for the same rows, then the path only needs to be computed once for each row.

Another variation is the EQUALS_PATH operator that returns TRUE for a row if the node associated with the row is the same as the input node. Also, the operator RELATIVE_PATH returns the path to the node associated with a row, relative to the input node.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

A method and apparatus for accessing hierarchical information stored in a relational database system is described. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Functional Overview

Techniques are described herein for managing, within a relational database system, data items that belong to an information hierarchy. According to embodiments of the invention, the hierarchy to which the data items belong is not transparent to the database system. Rather, the database system explicitly recognizes and manages the hierarchy, and provides support for queries that access the data items based on the position of data items within the hierarchy. In one embodiment, the database language supported by the relational database system is extended to include operators that produce output based on the position of data items within that hierarchy. Such hierarchical operators may be used in conjunction with the many relational operators supported by relational database languages to formulate powerful queries to access the information in which users are interested. In one embodiment, the operators include a "PATH" operator and an "UNDER_PATH" operator, both of which shall be described in greater detail hereafter.

System Overview

Figure 2:
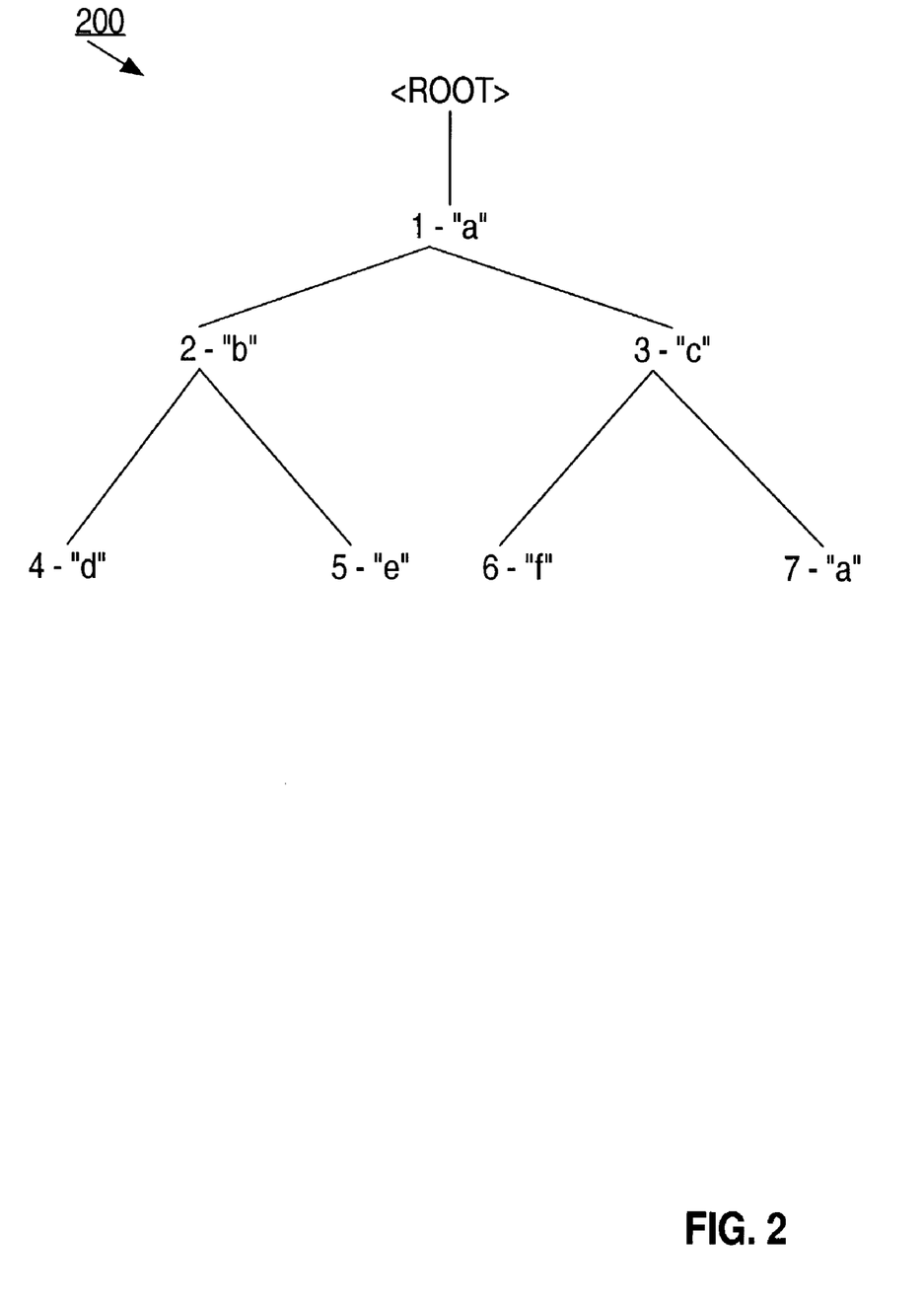
FIG. 2 is a block diagram illustrating an information hierarchy.

FIG. 2 is a block diagram that illustrates a hierarchy 200 that is used in examples that are provided herein to facilitate an understanding of embodiments of the invention. Hierarchy 200 includes eight nodes. The highest node in the hierarchy is referred to as the "root" node. The nodes at the end of each branch in the hierarchy are "leaf" nodes. The nodes between the root node and the leaf nodes are "intermediate" nodes. In the illustrated hierarchy, nodes 1, 2, and 3 are intermediate nodes, and nodes 4, 5, 6, and 7 are leaf nodes.

In an information hierarchy, the nodes correspond to information. Typically, the piece of information associated with each node will have some form of name, and some type of content. For example, in a hierarchy that corresponds to a hierarchical file system, the nodes will typically correspond to files (where a "folder" or "directory" is one type of file). Each such file will have a name, and some form of contents.

Frequently, the names that are associated with the nodes in a hierarchy need not be unique. In the example shown in FIG. 2, both node 1 and node 7 have the name "a". Though they have the same name, they are separate and distinct nodes, which occupy different positions in the hierarchy and may be associated with completely different content.

Figure 3:
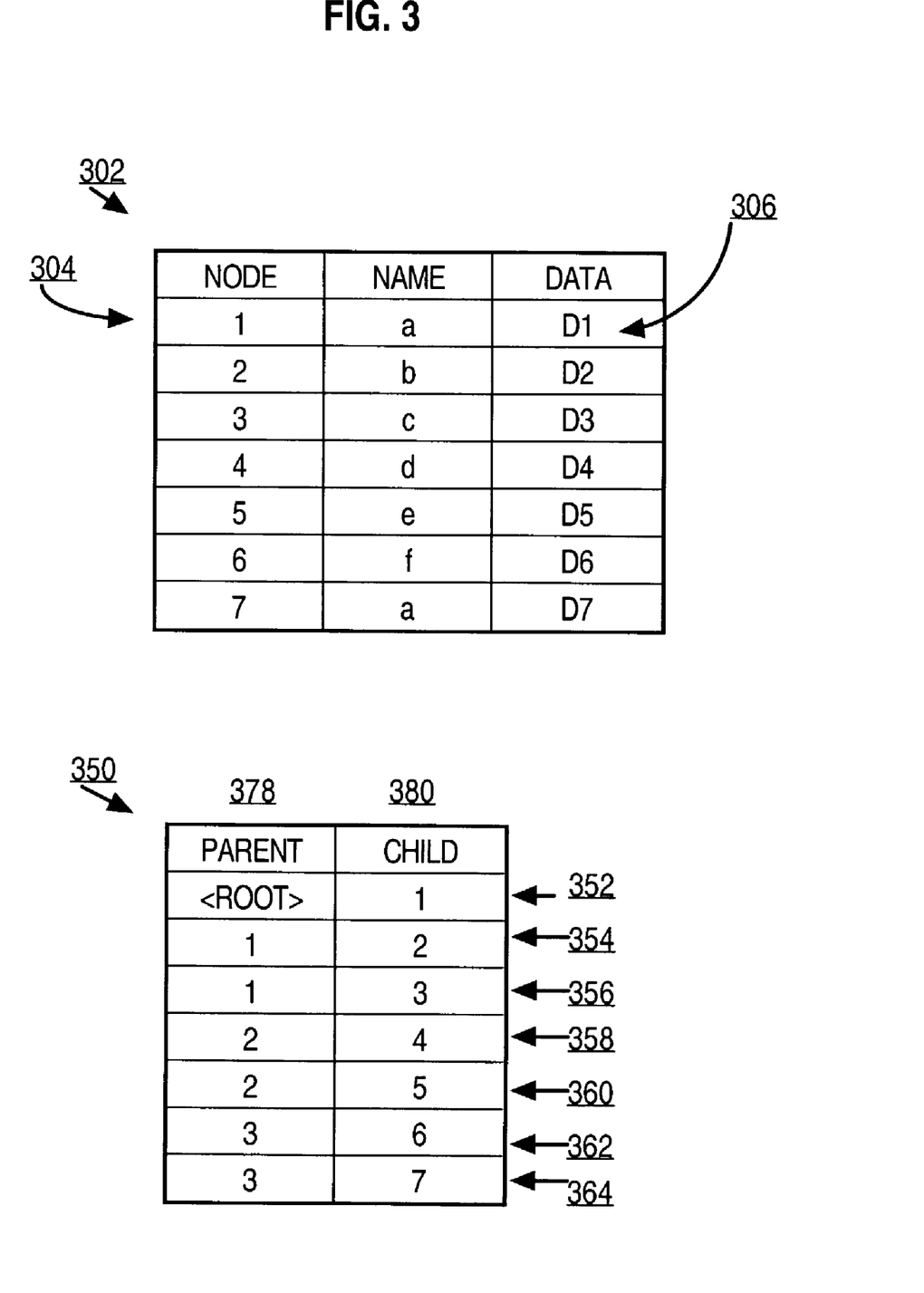
FIG. 3 is a block diagram illustrating tables that may be used to capture the information hierarchy illustrated in FIG. 2 within a relational system according to an embodiment of the invention.

FIG. 3 is a block diagram of two tables 302 and 350 that may be used to represent hierarchy 200 in a relational database system. Table 302 includes one row for each node in the hierarchy. The row for a given node includes the name associated with the given node and the data associated with the given node. For example, row 304 corresponds to node 1, and contains the name "a" and data 306 associated with node 1.

Table 350 includes one row for each of the parent-child relationships in hierarchy 200. A parent column 378 holds the value that specifies the parent in a parent-child relationship, and a child column 380 holds the value that specifies the child of the parent-child relationship. For example, row 352 indicates that the root node is the parent of node 1. Similarly, rows 354 and 356 respectively indicate that node 1 is the parent of nodes 2 and 3.

Tables 302 and 250, capture all the information of the hierarchy 200 in relational format. While embodiments of the invention shall be described hereafter through the use of examples that refer to hierarchy 200 and tables 302 and 350, such embodiments are merely exemplary. The way that a relational database system stores information about hierarchies may vary from implementation to implementation, and the present techniques are not limited to any particular implementation.

The UNDER_PATH Operator

According to one aspect of the invention, an "UNDER_PATH" hierarchical operator is provided to allow database statements to formulate explicit conditions related to whether nodes reside at or below a given node in a hierarchy. Specifically, in one embodiment, the UNDER_PATH operator has input parameters used to identify a node in the hierarchy. The node specified in the input parameters to the UNDER_PATH operator shall be referred to herein as the "input node". The UNDER_PATH operator returns TRUE for all nodes that include the input node in their path up to the root node. Thus, the set of nodes that cause the UNDER_PATH operator to return TRUE are the "descendants" of the input node.

According to one embodiment, the UNDER_PATH operator can be invoked in any one of the following ways:
INTEGER UNDER_PATH(resource_column, pathname)
INTEGER UNDER_PATH(resource_column, depth, pathname)
INTEGER UNDER_PATH(resource_column, pathname, correlation)
INTEGER UNDER_PATH(resource_column, depth, pathname, correlation)

where the arguments are defined as follows:
resource_column: The column name or column alias of the 'resource' column
pathname: The path name of the input node
depth: The maximum depth to search.
correlation: An integer that can be used to correlate the UNDER_PATH operator (a primary operator) with ancillary operators such as PATH and DEPTH.

For example, referring to hierarchy 200, the statement UNDER_PATH(node, '/a'), specifies node 1 as the input node for the UNDER_PATH operator. Similarly, the statement UNDER_PATH(node, '/a/c/a') specifies node 7 as the input node for the UNDER_PATH operator.

When node 1 is specified as the input node to the UNDER_PATH operator, the UNDER_PATH operator returns "TRUE" for the rows that correspond to nodes 2, 3, 4, 5, 6 and 7. When node 3 is specified as the input node to the UNDER_PATH operator, the UNDER_PATH operator returns "TRUE" for the rows that correspond to nodes 6 and 7. When node 1 is specified as the input node to the UNDER_PATH operator and a maximum depth of 1 is specified, the UNDER_PATH operator returns "TRUE" for only the rows that correspond to nodes 2 and 3.

UNDER_PATH Processing

A database server that represents hierarchy 200 through the use of tables 302 and 350 may execute the UNDER_PATH operation by scanning table 350 X+1 times, where X equals the length of the longest chain, within hierarchy 200, between the input node and any leaf node. If a maximum depth is specified, then the number of scans performed is the lesser of X+1 and the specified depth.

For example, assume that the predicate of a query includes the expression UNDER_PATH(node, '/a'). Initially, the database server initializes a "matching set" that is to include the nodes for which UNDER_PATH(node, '/a') evaluates to TRUE, and sets the matching set to NULL.

In the first pass, the database server scans table 350 to find the rows that have "1", which corresponds to '/a', in the parent column 378. In the present example, rows 354 and 356 include "1" in the parent column 378. From these rows, the database server adds the child nodes (2 and 3, respectively) to the matching set.

During each subsequent pass, the database server searches for rows that contain, in the parent column 378, the nodes that were added to the matching set in the previous pass. Thus, during the second pass, the database server searches for rows that have either 2 or 3 in the parent column 378. Rows 358 and 360 have 2 in the parent column 378, and rows 362 and 364 have 3 in the parent column 378. From rows 358, 360, 362 and 364 the database server respectively adds 4, 5, 6 and 7 to the matching set.

During the third pass, the database server searches for rows that contain nodes 4, 5, 6 or 7 in the parent column 378 (the nodes that were added to the matching set in the previous pass). None of the rows of table 350 have 4, 5, 6, or 7 in the parent column 378, so nothing is added to the matching set during the third pass. When a pass fails to add anything to the matching set, the matching set is complete and the UNDER_PATH expression is evaluated based on the members of the matching set. Specifically, the UNDER_PATH expression returns TRUE when applied to a row that corresponds to any member of the matching set, and FALSE when applied to rows that correspond to all other nodes.

According to alternative embodiment, the evaluation of the UNDER_PATH operator is performed more efficiently through the use of one or more indexes. For example, a hierarchical index, such as the index described in may be used to return the paths under a particular path. Such hierarchical indexes speed up access walking down a pathname. If the UNDER_PATH operator is used in the predicate of a query, and other parts of the query predicate are very selective, a functional implementation of UNDER_PATH may be chosen that will walk back up the hierarchy. Under these circumstances, walking up the hierarchy can be more efficient, since a much smaller number of links may need to be traversed.

The EQUALS_PATH Operator

According to one embodiment, an EQUALS_PATH operator is also provided. The EQUALS_PATH operator is defined as follows:

EQUALS_PATH: INTEGER EQUALS_PATH(resource_column, pathname)

The EQUALS_PATH operator is functionally equivalent to UNDER_PATH with a depth restriction of zero. Thus, it returns TRUE when evaluated against the row associated with the input node, and returns FALSE when evaluated against all other rows.

The DEPTH Operator

According to one embodiment, a DEPTH operator is provided. The DEPTH operator is defined as follows:

DEPTH: INTEGER DEPTH(correlation)

The DEPTH operator returns a number that indicates the depth, within the hierarchy, of the node associated with the row to which the operator is being applied. For example, when applied to the rows for nodes 1, 2, 3, 4, 5, 6 and 7 of hierarchy 200, the DEPTH operator returns the values 0, 1, 1, 2, 2, 2 and 2, respectively.

The PATH Operator

According to one aspect of the invention, a "PATH" hierarchical operator is provided. When applied to the row associated with a given node, the PATH operator produces a string made up of the names of the nodes that make up the chain that leads from the given node of the row up to the node specified by UNDER_PATH. The set of nodes identified in the string produced by applying the PATH operator to the row for a given node forms a relative path under the specified pathname in UNDER_PATH.

According to one embodiment, the PATH operator is defined as follows:

PATH: VARCHAR2 PATH(correlation)

where VARCHAR2 represents a string type.

A database server that represents hierarchy 200 through the use of tables 302 and 350 may evaluate the PATH expression for the row associated with a node by scanning table 350 X times, where X equals the level, within hierarchy 200, of the node. According to one embodiment, the evaluation of PATH proceeds as follows:

Initially, to construct the PATH of a node, the database server creates a string that includes the name of the node associated with the row to which the PATH operator is being applied. For the purpose of explanation, it shall be assumed that the PATH operator is being applied to the row associated with node 5 of hierarchy 200. Thus, the database server initially creates the string "/e".

After the initial string is created, the database server scans table 350 to identify the row in which 5 is the value of the child column 380. In the present example, the database server would locate row 360. From row 360, the database server would read that node 2 is the parent of node 5. From table 302, the database server would determine that the name of node 2 is "b". Based on this information, the string "/b" is added to the string "/e" to create the string "/b/e".

Once again the database server scans table 350, this time to identify the row that contains 2 in child column 380. In the present example, the database server would locate row 354. From row 354, the database server would read that node 1 is the parent of node 2. Table 302 indicates that "a" is the name of node 1. Node "a" is the root node, so the path construction operation is complete. Thus, the final result string is "/b/e", which is relative to "/a".

The process of scanning table 350 to find the parent to each new node that is added to the path is repeated until the input node is reached. Because the root node has no parent, the PATH string is complete when the root node is reached. In the present example, the string produced by applying the PATH operator to node 5 is "/b/e".

Views

There are a variety of contexts in which hierarchical operators may be useful. Once such context is the definition of views. For example, a user may create a view (RV) of the hierarchical data based on the following view definition:

RV: Select PATH from R$ where UNDER_PATH(root)= True;

In this example, R$ is table 302.

When executed, view RV produces one row for each node in hierarchy 200, where the row associated with a given node contains the relative path to the node. For example, the row produced in the view for node 2 would contain the path "/a/b". Similarly, the row produced in the view for node 6 would contain the path "/a/c/f". In this example, the condition "UNDER_PATH(root)=True" would filter out any rows in table 302 that do not correspond to nodes of hierarchy 200. Such a filter is useful, for example, if table 302 is used to store information for numerous hierarchies.

Evaluation Optimizations

As mentioned above, the evaluation of hierarchical operators may involve performing numerous scans of the table 350 that stores the parent-child relationship information. One way to reduce the cost of the evaluations is to use an index, as mentioned above. Another way to reduce the cost of the evaluations involves using information obtained during the evaluation of one hierarchical operator for the evaluation of another hierarchical operator. For example, a single database statement may contain both the PATH and UNDER_PATH operators. The information obtained in the same scans of table 350 can be used to evaluate both operators.

Hardware Overview

Figure 4:
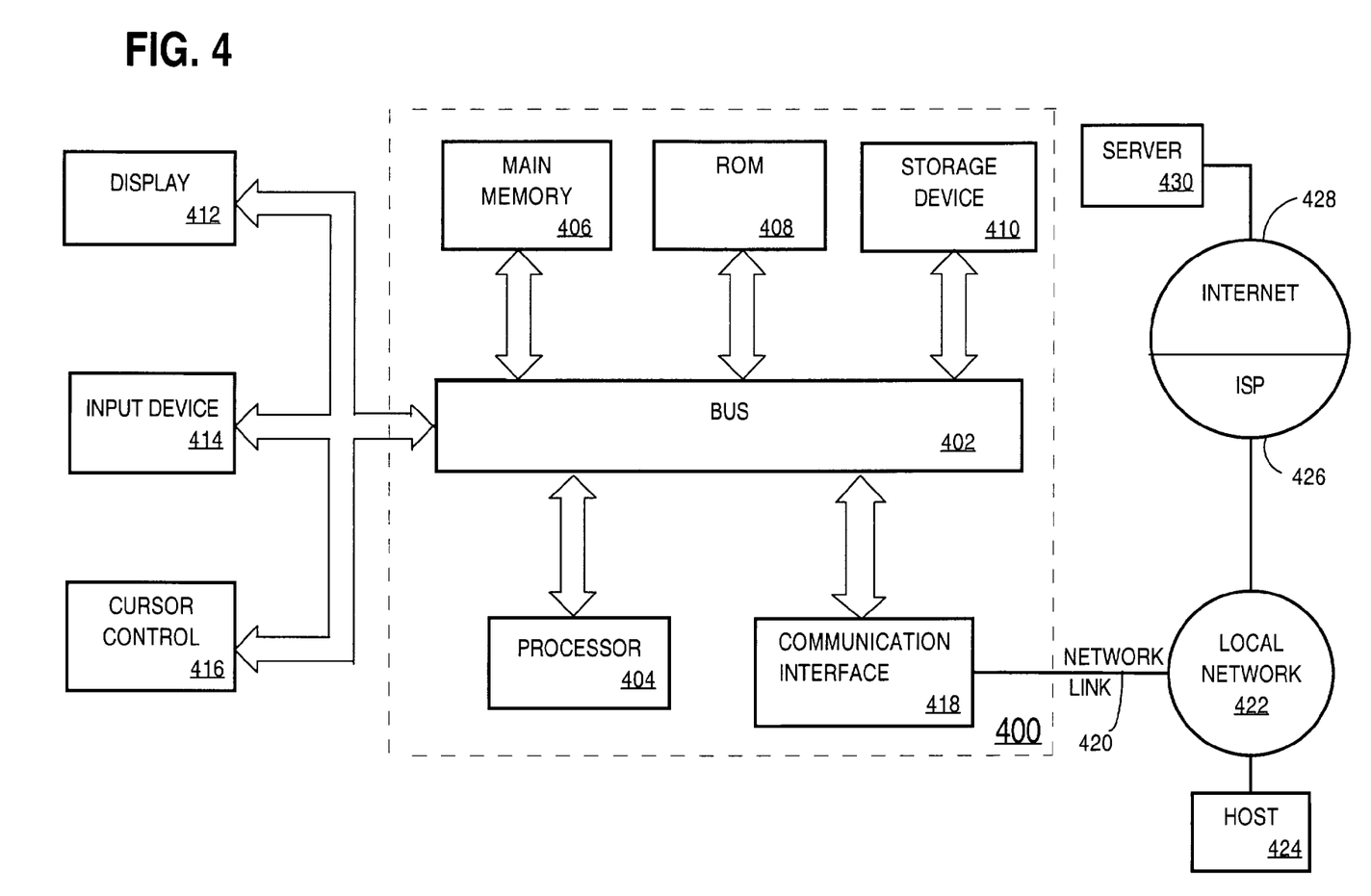
FIG. 4 is a block diagram of a system on which embodiments of the invention may be implemented.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of accessing information managed by a relational database system, the method comprising the steps of:
   receiving a database language statement that specifies selection criteria for selecting rows managed by the database system;
   wherein the rows are associated with nodes in a hierarchy;
   wherein the statement includes an operator that specifies that results of said statement are based, at least in part, on respective positions, within the hierarchy, of the nodes associated with the rows;
   during execution of said statement, evaluating said operator using information managed by the relational database system about said hierarchy; and
   wherein said database language defines said operator as one that evaluates to an output value based on respective positions of nodes within a given hierarchy.

2. The method of claim 1 wherein the step of evaluating the operator includes determining whether a row is associated with a node, within the hierarchy, that has a particular position relative to a particular node in the hierarchy.

3. The method of claim 2 wherein the step of determining whether a row is associated with a node, within the hierarchy, that has a particular position relative to a particular node in the hierarchy includes the step of determining whether the row is associated with a node that is under the particular node in the hierarchy.

4. The method of claim 3 wherein the step of determining whether the row is associated with a node that is under the particular node in the hierarchy includes the steps of:
   if conditions in said statement are relatively more restrictive, then traversing up the hierarchy from said node; and
   if conditions in said statement are relatively less restrictive, then traversing down the hierarchy from the particular node.

5. The method of claim 2 wherein the step of determining whether a row is associated with a node, within the hierarchy, that has a particular position relative to a particular node in the hierarchy includes the step of determining whether the row is associated with the particular node in the hierarchy.

6. The method of claim 2 wherein the step of determining whether a row is associated with a node, within the hierarchy, that has a particular position relative to a particular node in the hierarchy includes the step of determining whether the row is associated with a node that is within a specified number of levels under the particular node in the hierarchy.

7. The method of claim 1 wherein the step of evaluating said operator includes determining a path, within the hierarchy, to a particular node.

8. The method of claim 1 wherein the step of evaluating said operator includes determining a depth, within the hierarchy, of a node associated with a particular row.

9. The method of claim 1 wherein the step of evaluating said operator using information managed by the relational database system about said hierarchy includes evaluating said operator using a relational table that includes rows that hold data indicating parent-child relationships between nodes of said hierarchy.

10. The method of claim 9 wherein the statement includes a plurality of hierarchical operators, the method further comprising using information obtained in a particular scan of the relational table to evaluate each of said plurality of hierarchical operators.

11. The method of claim 10 wherein the plurality of hierarchical operators include at least two operators from a set that includes UNDER_PATH, PATH, DEPTH, and EQUALS_PATH.

12. A computer-readable medium carrying instructions for accessing information managed by a relational database system, the instructions comprising instructions for performing the steps of:
   receiving a database language statement that specifies selection criteria for selecting rows managed by the database system;
   wherein the rows are associated with nodes in a hierarchy;
   wherein the statement includes an operator that specifies that results of said statement are based, at least in part, on respective positions, within the hierarchy, of the nodes associated with the rows;
   during execution of said statement, evaluating said operator using information managed by the relational database system about said hierarchy; and
   wherein said database language defines said operator as one that evaluates to an output value based on respective positions of nodes within a given hierarchy.

13. The computer-readable medium of claim 12 wherein the step of evaluating the operator includes determining whether a row is associated with a node, within the hierarchy, that has a particular position relative to a particular node in the hierarchy.

14. The computer-readable medium of claim 13 wherein the step of determining whether a row is associated with a node, within the hierarchy, that has a particular position relative to a particular node in the hierarchy includes the step of determining whether the row is associated with a node that is under the particular node in the hierarchy.

15. The computer-readable medium of claim 13 wherein the step of determining whether a row is associated with a node, within the hierarchy, that has a particular position relative to a particular node in the hierarchy includes the step of determining whether the row is associated with the particular node in the hierarchy.

16. The computer-readable medium of claim 13 wherein the step of determining whether a row is associated with a node, within the hierarchy, that has a particular position relative to a particular node in the hierarchy includes the step of determining whether the row is associated with a node that is within a specified number of levels under the particular node in the hierarchy.

17. The method of claim 12 wherein the step of evaluating said operator includes determining a path, within the hierarchy, to a particular node.

18. The computer-readable medium of claim 12 wherein the step of evaluating said operator includes determining a depth, within the hierarchy, of a node associated with a particular row.

19. The computer-readable medium of claim 12 wherein the step of evaluating said operator using information managed by the relational database system about said hierarchy includes evaluating said operator using a relational table that includes rows that hold data indicating parent-child relationships between nodes of said hierarchy.

20. The computer-readable medium of claim 19 wherein the statement includes a plurality of hierarchical operators, the computer-readable medium further comprising instructions for using information obtained in a particular scan of the relational table to evaluate each of said plurality of hierarchical operators.

21. The computer-readable medium of claim 20 wherein the plurality of hierarchical operators include at least two operators from a set that includes UNDER_PATH, PATH, DEPTH, and EQUALS_PATH.

* * * * *

UNITED STATES PATENT AND TRADEMARK OFFICE
CERTIFICATE OF CORRECTION

PATENT NO. : 7,028,037 B1
APPLICATION NO. : 10/260138
DATED : April 11, 2006
INVENTOR(S) : Nipun Agarwal et al.

It is certified that error appears in the above-identified patent and that said Letters Patent is hereby corrected as shown below:

Title Page
In Related U.S. Application Data:

"Provisional application No. 60/326,052, filed on Sept. 28, 2001, provisional application No. 60/678,800, filed on May 7, 2002" should read --Provisional application No. 60/326,052, filed on Sept. 28, 2001, provisional application No. 60/378,800, filed on May 7, 2002.--

Signed and Sealed this

First Day of August, 2006

JON W. DUDAS
*Director of the United States Patent and Trademark Office*